US006941509B2

(12) United States Patent
Harris

(10) Patent No.: US 6,941,509 B2
(45) Date of Patent: Sep. 6, 2005

(54) EDITING HTML DOM ELEMENTS IN WEB BROWSERS WITH NON-VISUAL CAPABILITIES

(75) Inventor: Elliott Woodard Harris, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 09/844,342

(22) Filed: Apr. 27, 2001

(65) Prior Publication Data

US 2002/0161805 A1 Oct. 31, 2002

(51) Int. Cl.$^7$ .............................................. G01L 13/00
(52) U.S. Cl. ................... 715/501.1; 715/513; 715/530; 704/260; 704/270.1
(58) Field of Search ............................ 715/501.1, 513, 715/530; 345/760; 704/260, 270.1

(56) References Cited

U.S. PATENT DOCUMENTS

| | | | |
|---|---|---|---|
| 5,186,629 A | 2/1993 | Rohen | 434/114 |
| 5,223,828 A | 6/1993 | McKiel, Jr. | 340/825.19 |
| 5,528,739 A | 6/1996 | Lucas et al. | 395/145 |
| 5,819,220 A | 10/1998 | Sarukkai et al. | 704/243 |
| 5,884,262 A | 3/1999 | Wise et al. | 704/270 |
| 5,884,266 A | 3/1999 | Dvorak | 704/275 |
| 5,899,975 A | 5/1999 | Nielsen | 704/260 |
| 5,953,392 A | 9/1999 | Rhie et al. | 704/275 |
| 5,991,781 A | 11/1999 | Nielsen | 707/513 |
| 6,018,710 A | 1/2000 | Wynblatt et al. | 704/260 |
| 6,085,161 A * | 7/2000 | MacKenty et al. | 704/270 |
| 6,088,675 A | 7/2000 | MacKenty et al. | 704/270 |
| 6,101,472 A | 8/2000 | Giangarra et al. | 704/275 |
| 6,115,686 A | 9/2000 | Chung et al. | 704/260 |
| 6,353,850 B1 | 3/2002 | Wies et al. | 709/203 |
| 6,459,364 B2 | 10/2002 | Gupta | 340/407.1 |
| 6,587,822 B2 * | 7/2003 | Brown et al. | 704/275 |
| 6,604,075 B1 | 8/2003 | Brown et al. | 704/270.1 |
| 6,643,621 B1 | 11/2003 | Dodrill et al. | 704/275 |
| 6,717,593 B1 * | 4/2004 | Jennings | 345/760 |
| 6,721,781 B1 | 4/2004 | Bates et al. | 709/203 |
| 6,775,805 B1 | 8/2004 | Watanabe et al. | 715/513 |

OTHER PUBLICATIONS

HTML 4.01 Specification, W3C Recommendation Dec. 24, 1999, Dave Raggett, pp. 1–15.*
Frames in HTML Documents, W3C Recommendation Dec. 24, 1999, Dave Raggett, pp. 1–15.*
Jane Berliss, Designing World Wide Web Pages For Maximum Accessibility, Nov. 22, 1997, pp. 1–6.*
SPUSC Monash 2000, See me, Hear me, Touch me Access and Equity on the Web, pp. 1–18.*

* cited by examiner

*Primary Examiner*—Stephen Hong
*Assistant Examiner*—Matthew Ludwig
(74) *Attorney, Agent, or Firm*—Duke W. Yee; Marilyn Smith Dawkins; Wayne P. Bailey

(57) ABSTRACT

A method, program and apparatus for rendering an image area in an electronic document are provided by means of a web browser having non-visual capabilities. The invention comprises parsing a web page and creating a document object model (DOM). The browser then determine if an image in the web page contains a "long description" attribute that names a URL address for a second web page. This second web page contains a long description of the image in the first web page. If the image does have this attribute, the browser creates a new subtree within the DOM of the first web page, and places the subtree adjacent to the image in the DOM. The subtree presents a visible and renderable hyperlink to the second web page containing the long description. The browser will then render the image and/or hyperlink. The image and hyperlink can be rendered audibly, tactilely, visually, or by a combination of these methods, depending on the needs of the user.

16 Claims, 4 Drawing Sheets

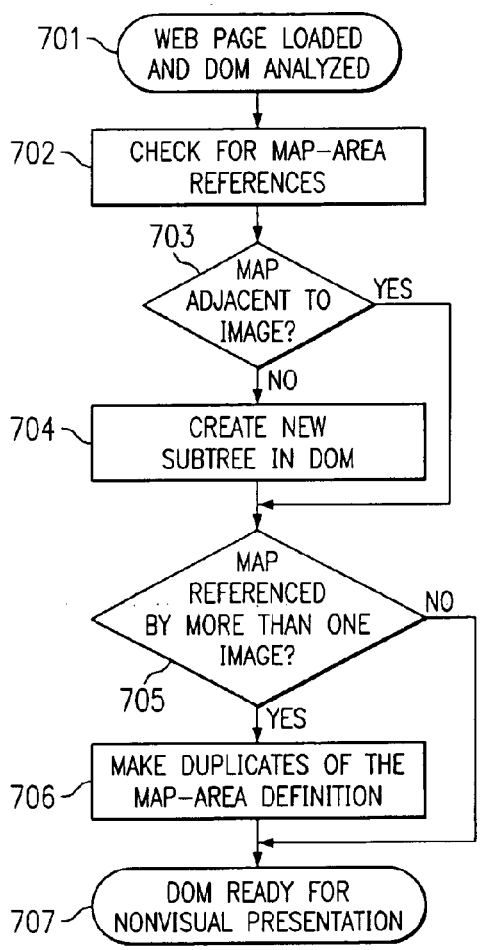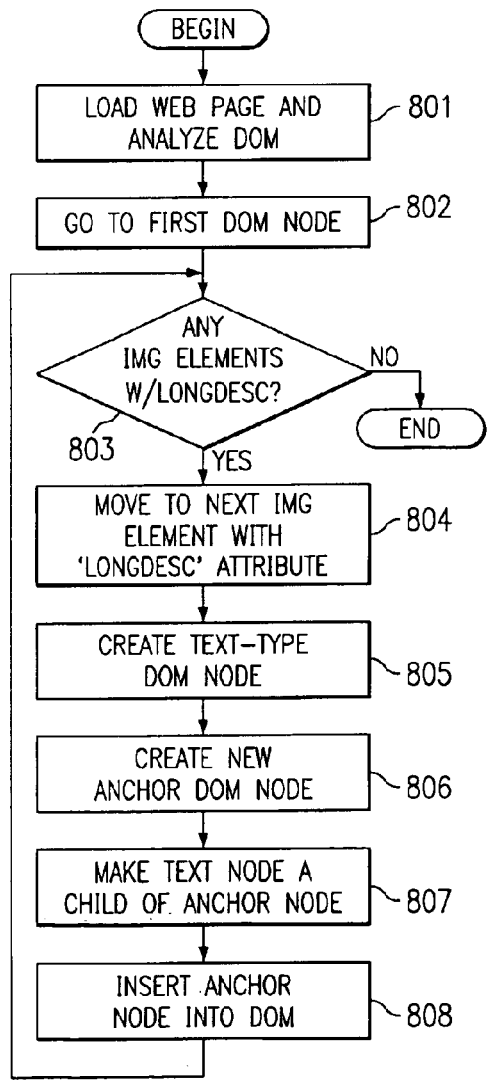

EDITING HTML DOM ELEMENTS IN WEB BROWSERS WITH NON-VISUAL CAPABILITIES

CROSS REFERENCE TO RELATED APPLICATIONS

The present application is related to co-pending U.S. patent application Ser. No. 09/844,393 entitled "METHOD FOR PRESENTATION OF HTML IMAGE-MAP ELEMENTS IN NON VISUAL WEB BROWSERS" filed even date herewith. The content of the above mentioned commonly assigned, co-pending U.S. patent applications are hereby incorporated herein by reference for all purposes.

BACKGROUND OF THE INVENTION

1. Technical Field

The present invention relates to computer network environments and more specifically to non-visual presentation of electronic documents.

2. Description of Related Art

Information on the World Wide Web is typically made available by structuring the information into a visual presentation. Hyper Text Markup Language (HTML) is used by web authors to define the visual structure. The end user is presented with this information by viewing the information on a computer display, after the information has been rendered into a visual format by a web browser (e.g. Netscape Navigator or MS Internet Explorer).

Web sites of well established businesses and organizations make extensive use of visual images. A HTML MAP defines a set of sub-regions over the image area. Each region is called an AREA, and is defined by an AREA element within the MAP definition. Each AREA can be associated with an Internet Uniform Resource Locator (URL). When the end user performs a mouse click within an area defined by the MAP, the web browser will navigate the associated URL. This process works well for a sighted user who is accessing the web using a visual browser. However, this process is not accessible by people with vision impairments, nor is it accessible by users who do not have a visual display device available (e.g. while driving a car).

A variety of software products are becoming available which enable non-visual access to HTML pages. These products capture the web page content and then present an audible rendering of the web page. This is generally accomplished by using a text-to-speech (TTS) technology to read the textual content.

HTML, which is used to provide a visual structure to a web page, also provides a semantic structure to the page. Well known techniques exist for parsing an HTML source file into a parse tree, also known as a Document Object Model (DOM). The various structural elements and relationships among the elements are then apparent from the topology of the parse tree. The DOM is accessible as a component, and this component provides the foundation needed to build a non-visual browser.

In an HTML page, a MAP-AREA definition is a non-visible element. Consequently, the web author is free to locate the MAP-AREA definition within the DOM wherever the author pleases. A cross referencing scheme is then used to associate the MAP-AREA definition with a corresponding IMAGE within the DOM. However, the physical separation of the IMAGE from the MAP-AREA definition introduces a fair amount of program complexity when the HTML page is being presented by a non-visual browser. Currently, non-visual browsers must maintain extensive internal records in order to keep track of the logical association between a MAP-AREA and an IMAGE in the DOM.

Therefore, it would be desirable to have a method for maintaining the logical association between corresponding IMAGE-AREAs and IMAGEs in a DOM, while reducing program complexity and the need for extensive record keeping.

SUMMARY OF THE INVENTION

The present invention provides a method, program and apparatus for the rendering an image area in an electronic document by means of a non-visual browser. The invention comprises parsing a web page and creating a document object model (DOM). The browser then determine if an image in the web page contains a "long description" attribute that names a URL address for a second web page. This second web page contains a long description of the image in the first web page. If the image does have this attribute, the browser creates a new subtree within the DOM of the first web page, and places the subtree adjacent to the image in the DOM. The subtree presents a visible and renderable hyperlink to the second web page containing the long description. The browser will then render the image and/or hyperlink. The image and hyperlink can be rendered audibly, tactilely, visually, or by a combination of these methods, depending on the needs of the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a flowchart illustrating the process of editing a DOM in accordance with the present invention; and FIG. 8 depicts a flowchart illustrating the process of creating a new subtree within a DOM in accordance with the present invention.

DETAILED DESCRIPTION OF THE PREFERRED EMBODIMENT

Figure 1:
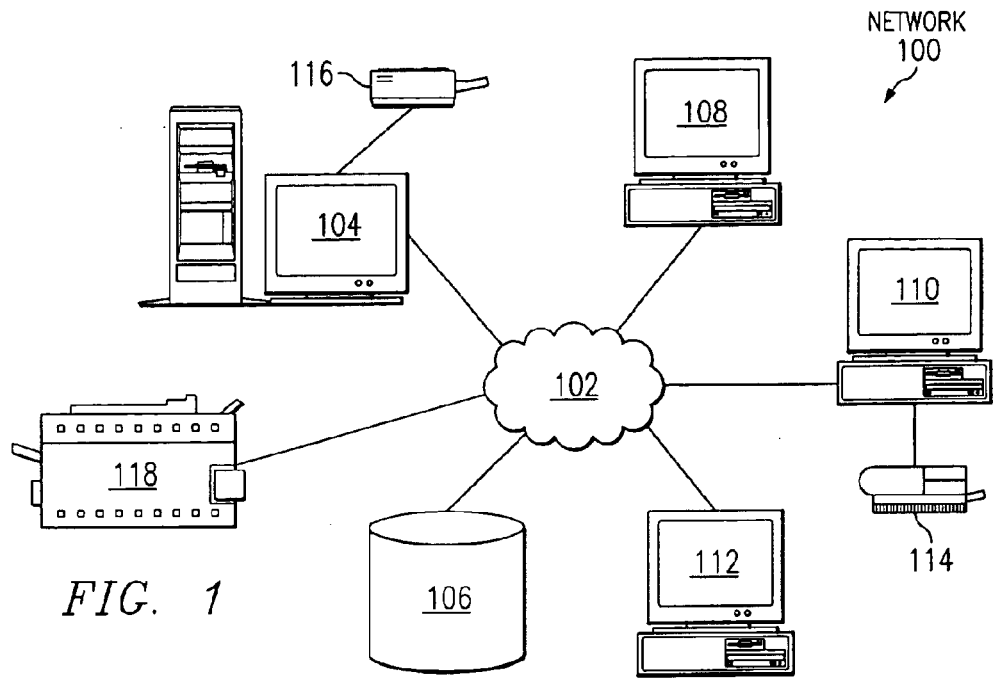
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
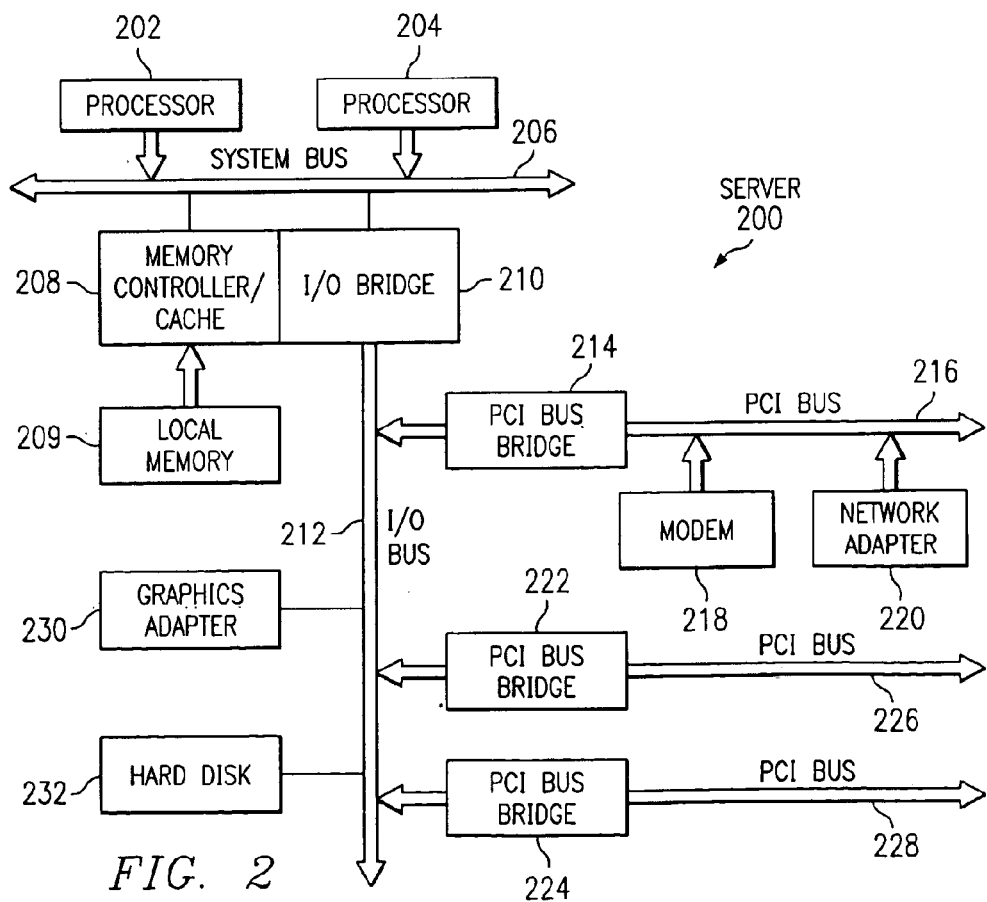
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
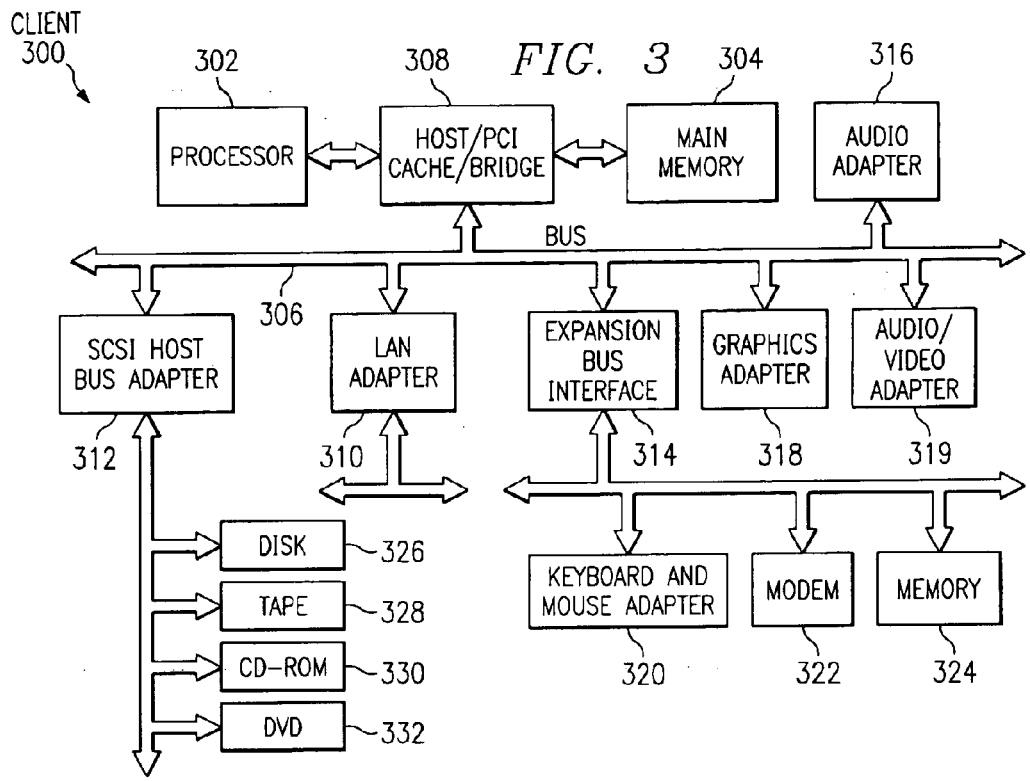
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations.

For example, data processing system 300 also may be a notebook computer or hand held computer in addition to taking the form of a PDA. Data processing system 300 also may be a kiosk or a Web appliance.

Figure 4:
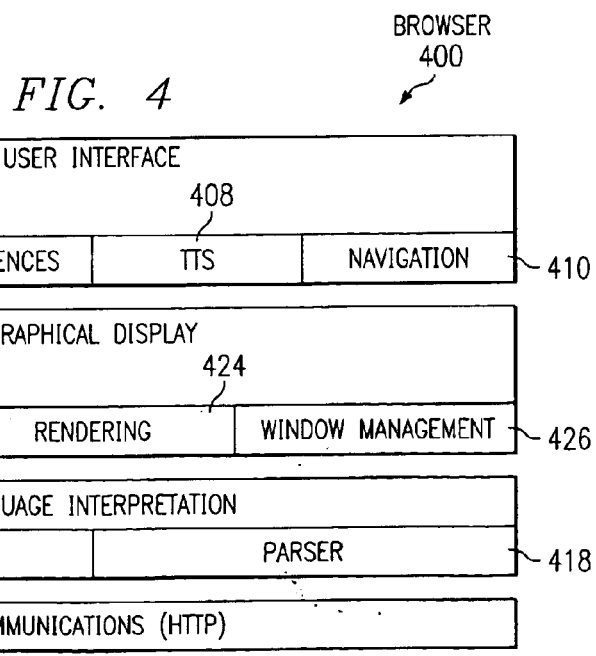
FIG. 4 depicts a block diagram of a browser program in accordance with a preferred embodiment of the present invention.

Turning next to FIG. 4, a block diagram of a browser program is depicted in accordance with a preferred embodiment of the present invention. Browser 400 includes a user interface 402, which is a graphical user interface (GUI) that allows the user to interface or communicate with browser 400. This interface provides for selection of various functions through menus 404 and allows for navigation through the navigation input 410. For example, menu 404 may allow a user to perform various functions, such as saving a file, opening a new window, displaying a history, and entering a URL. Navigation 410 allows for a user to navigate various pages and to select web sites for viewing. For example, navigation 410 may allow a user to see a previous page or a subsequent page relative to the present page. Navigation 410 may also have voice recognition capabilities. Preferences may be set through preferences 406. Browser 400 also contains text-to-speech (TTS) 408, which converts text data into auditory signals.

Communications 412 is the mechanism with which browser 400 receives documents and other resources from a network such as the Internet. Further, communications 412 is used to send or upload documents and resources onto a network. In the depicted example, communication 412 uses HTTP. However, other protocols are possible. Documents that are received by browser 400 are processed by language interpretation 414, which includes an HTML unit 416, and a parser 418 which is capable of generating a parse tree associated with an electronic document, as discussed below in reference to FIG. 6. Language interpretation 414 will process a document for presentation on graphical display 420. In particular, HTML statements are processed by HTML unit 416 for presentation.

Graphical display 420 includes layout unit 422, rendering unit 424, and window management 426. These units are involved in presenting web pages to a user based on results from language interpretation 414.

Browser 400 is presented as an example of a browser program in which the present invention may be embodied. Browser 400 is not meant to imply architectural limitations to the present invention. Presently available browsers may include additional functions not shown or may omit functions shown in browser 400. As used herein, the term "browser" encompasses any software application used to view or navigate for information or data (e.g. something that assists a user to browse) in a distributed data base where the distributed database is typically the internet or World Wide Web.

A variety of software products are becoming available which enable non-visual access to HTML pages. These products capture the web page content and then present an audible rendering of the web page. This is generally accomplished by using a text-to-speech (TTS) technology to read the textual content. However, TTS technology cannot directly render an image. Prior art approaches to the problem involve either ignoring the image or simply announcing the fact that there is an image that contains MAP-AREAs.

HTML, which is used to provide a visual structure to a web page, also provides a semantic structure to the page. Well known techniques exist for parsing an HTML source file into a parse tree. The various structural elements and relationships among the elements are then apparent from the topology of the parse tree. The parse tree is also called a Document Object Model (DOM). The present invention relies on information contained within the DOM to provide a non-visual rendering of web page images.

Figure 5:
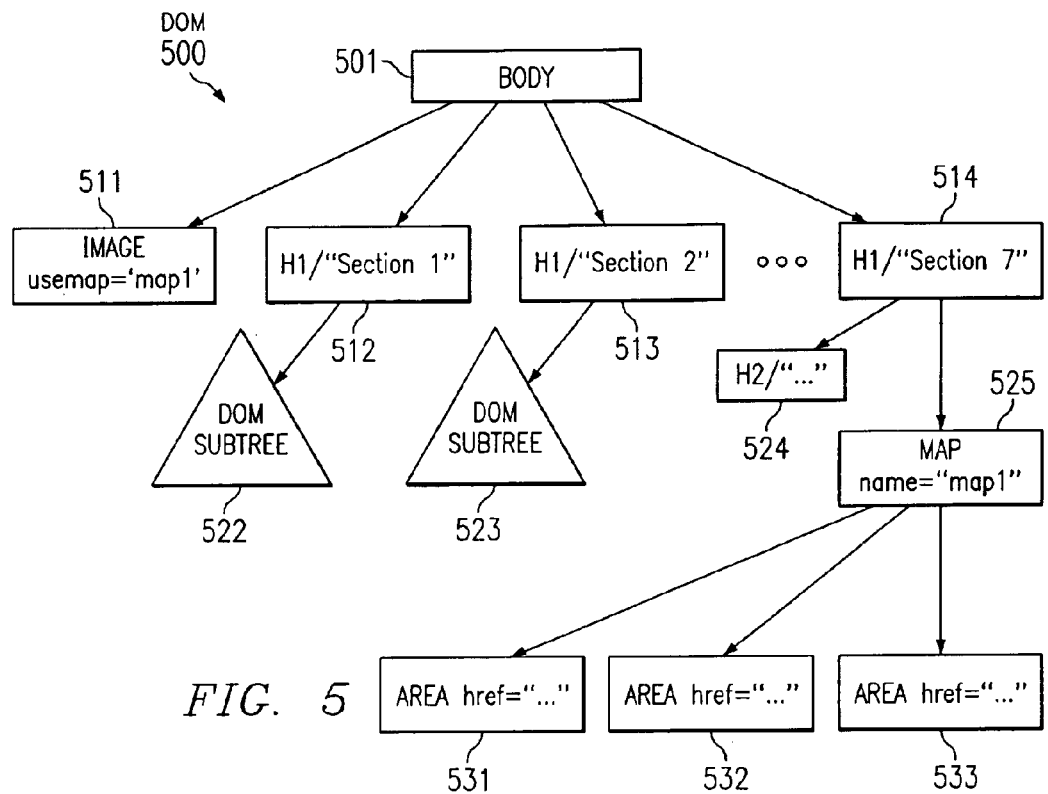
FIG. 5 depicts a diagram illustrating a Document Object Model in accordance with the prior art.

Referring to FIG. 5, a diagram illustrating a Document Object Model is depicted in accordance with the prior art. Current web browser component technology (i.e. MS IE 5.0+, or Mozilla) maintains a DOM for the web page currently displayed. The DOM is accessible as a component, and this component provides the foundation needed to build a non-visual browser.

The MAP-AREA elements 531–533 in DOM 500 describe the subregions of the IMAGE 511, and the hyperlinks associated with each subregion. However, the MAP-AREA 525 is normally not shown in a HTML page. Since the MAP-AREA 525 is not visible, web authors frequently put it at the bottom of the page, where it would be completely out of context with the visible, informational content around it. Because the IMAGE 511 and MAP-AREA 525 are separated in the web page (and DOM), a cross referencing scheme, "IMAGE usemap=map1" 511 and "MAP name=map1" 525, is used to associate the separate parts of the document.

However, the physical separation of the IMAGE 511 from the MAP-AREA definition 525 introduces a fair amount of program complexity when the HTML page is being presented by a web browser with non-visual capabilities. A non-visual browser must describe the map at the same time it describes the image. An object of the present invention is to provide an algorithm that makes this process easier to perform. Though prior art browsers can respect the logical association between a separated image and map by maintaining extensive internal records, the present invention provides a simpler approach.

Figure 6:
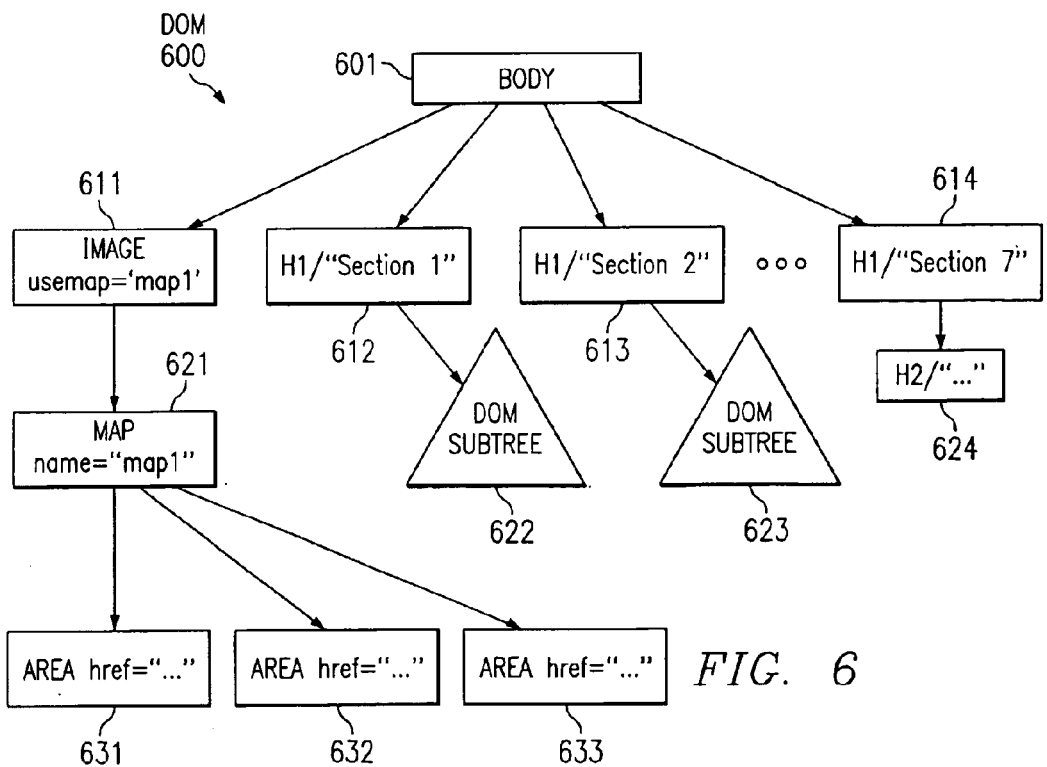
FIG. 6 depicts a diagram illustrating an edited DOM in accordance with the present invention.

Referring now to FIG. 6, a diagram illustrating an edited DOM is depicted in accordance with the present invention. The present invention comprises modifying the DOM to move the MAP-AREA definition 621 to be adjacent to the IMAGE 611. Logically, this is the same as dynamically rewriting the web page to eliminate the problem with its topology.

Referring to FIG. 7, a flowchart illustrating the process of editing a DOM is depicted in accordance with the present invention. When a web page is first loaded, it is parsed, and a DOM is created which can be analyzed for IMAGE-MAPs (step 701). The browser then checks for any MAP-AREA references (step 702) and determines whether or not the MAP is adjacent to the IMAGE element (step 703). If the MAP is not adjacent to the IMAGE, a new subtree is created in the DOM which places the content of the MAP-AREA definition in proximity to the IMAGE (step 704). This provides a topology which requires no internal bookkeeping to deal with this issue of separated images and maps. The browser then checks if the MAP is referenced by more than one IMAGE (step 705). If the MAP is referenced by more than one IMAGE (which is unusual), duplicate copies of the MAP-AREA definition can be made so that the one MAP-AREA definition is directly adjacent to each IMAGE which references it (step 706).

An image on a web page can have a "longdesc" (long description) attribute. A "longdesc" names the URL where a long description of an image can be found. This attribute was added to HTML by the industry standards group (the w3c) precisely for Accessibility needs. For example, a web page may have a "Welcome" image. The longdesc attribute associated with the image might reference another web page which says "This is an image which welcomes customers to this page. There are three hyperlinks on the image." Currently, the major commercial web browsers (IE, Netscape, Mozilla) all ignore this attribute.

Because non-visual technology cannot directly render a web page image, the present invention allows a user to access the longdesc attribute in order to obtain an indirect, non-visual rendering of image content. The present invention uses the long description associated with an image as a surrogate for the image itself.

Referring to FIG. 8, a flowchart illustrating the process of creating a new subtree within a DOM is depicted in accordance with the present invention. After the browser loads a web page and analyzes the DOM (step 801), the browser proceeds to the first DOM node (step 802). The browser then checks for Image elements with long description attributes (step 803). If there are no such Image elements, the process ends. If there are Image elements with long descriptions, the browser moves to the next one in the DOM (step 804).

A text node which reads "Image description" is created (step 805). Then, a new Anchor node is created and set up so that its hyperlink points to the long description URL (step 806). The new text node, which reads "Image description" is made a child of the new Anchor node, so that this text appears as the visible hyperlink (step 807). Finally, the new Anchor node is inserted into the DOM as the first sibling node following the Image element (step 808). From there, the browser returns to Step 803 to determine if there are any more Image elements in the DOM with long description attributes.

Rather than relying on the addition of special code for the longdesc attribute, the present invention transforms the DOM so that existing algorithms render the Accessibility information. The DOM transformation of the present invention makes the long description visible and renderable to anyone using today's current commercial web browsers (e.g. Mozilla or Internet Explorer). Currently, these browsers do not support the long description, and the information is lost.

After the DOM edits are performed, subsequent DOM traversal is much more straightforward. All navigation operations can be handled using simple tree walk order navigation algorithms. This process is the subject of typical undergraduate computer science education and such algorithms are available in most any computer science textbook on data structures. One such reference is *Introduction to Algorithms*, by Cormen, Leiserson, Rivest, 19th printing, ISBN 0-262-53091-0. See INORDER-TREE-WALK algorithm in section 13.1 on p. 245. The non-visual browser can now render the MAP-AREAS audibly with less extensive bookkeeping than that required by the prior art. In another embodiment, the non-visual browser renders the MAP-AREAs by means of a tactile feedback mechanism.

It should be pointed out that the non-visual rendering techniques of the present invention are not exclusive of traditional visual rendering. Both visual and non-visual rendering techniques may be used in conjunction with each other, depending on the needs of the user.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for rendering an image area in an electronic document, comprising:

parsing a first electronic document and creating a document object model;

determining if an image within the first electronic document has an associated attribute that names a uniform resource locator address for a second electronic document, wherein the second electronic document contains a long description of the image within the first electronic document; and creating a new subtree within the document object model of the first electronic document, wherein the subtree is a first sibling node following the image in the document object model, and wherein the subtree comprises a renderable hyperlink to the second electronic document containing the long description of the image; and rendering at least one of the following:
   i) the image, and
   ii) the renderable hyperlink.

2. The method according to claim 1, wherein the image is rendered by means of an audio rendering of the long description.

3. The method according to claim 1, wherein the image is rendered by means of a tactile rendering of the long description.

4. The method according to claim 1, wherein the hyperlink is rendered audibly.

5. The method according to claim 1, wherein the hyperlink is rendered by means of a tactile feedback mechanism.

6. The method according to claim 1, further comprising:

duplicating the attribute, if there are multiple images within the document object model which correspond to the attribute; and placing the duplicate attributes adjacent to all corresponding images within the document object model.

7. A computer program product in a computer readable medium for use in a data processing system, for rendering an image area in an electronic document, comprising:

instructions for parsing a first electronic document and creating a document object model;

instructions for determining if an image within the first electronic document has an associated attribute that names a uniform resource locator address for a second electronic document, wherein the second electronic document contains a long description of the image within the first electronic document;

instructions for creating a new subtree within the document object model of the first electronic document, wherein the subtree is a first sibling node following the image in the document object model, and wherein the subtree comprises a renderable hyperlink to the second electronic document containing the long description of the image; and instructions for rendering at least one of the following:
   i) the image, and
   ii) the renderable hyperlink.

8. The computer program product according to claim 7, wherein the image is rendered by means of an audio rendering of the long description.

9. The computer program product according to claim 7, wherein the image is rendered by means of a tactile rendering of the long description.

10. The computer program product according to claim 7, wherein the hyperlink is rendered audibly.

11. The computer program product according to claim 7, wherein the hyperlink is rendered by means of a tactile feedback mechanism.

12. The computer program product according to claim 7, further comprising:

instructions for duplicating the attribute, if there are multiple images within the document object model which correspond to the attribute; and instructions for placing the duplicate attributes adjacent to all corresponding images within the document object model.

13. A system for rendering an image area in an electronic document, comprising:

a parser which parses a first electronic document and creates a document object model;

an analyzing component which determines if an image within the first electronic document has an associated attribute that names a uniform resource locator address for a second electronic document, wherein the second electronic document contains a long description of the image within the first electronic document;

an editing component which creates a new subtree within the document object model of the first electronic document, wherein the subtree is a first sibling node following the image in the document object model, and wherein the subtree comprises a renderable hyperlink to the second electronic document containing the long description of the image; and a rendering mechanism which renders at least one of the following:
      i) the image, and
      ii) the renderable hyperlink.

14. The system according to claim 13, wherein the rendering mechanism is an audio speaker.

15. The system according to claim 13, wherein the rendering mechanism is a tactile feedback mechanism.

16. The system according to claim 13, further comprising:

a duplicating component which duplicates the attribute if there are multiple images within the document object model which correspond to the attribute; and an editing component which places the duplicate attributes adjacent to all corresponding images within the document object model.

* * * * *